Dec. 22, 1959     B. SCHENKER     2,918,635

WAVE FILTER

Filed Jan. 17, 1955

INVENTOR.
BERNARD SCHENKER
BY
Connolly and Hutz
HIS ATTORNEYS

United States Patent Office 2,918,635
Patented Dec. 22, 1959

2,918,635

WAVE FILTER

Bernard Schenker, Williamstown, Mass., assignor to Sprague Electric Company, North Adams, Mass., a corporation of Massachusetts Application January 17, 1955, Serial No. 482,262

1 Claim. (Cl. 333—79)

This invention relates to wave filters, more particularly such filters as have a plurality of capacitors combined with other impedance elements.

In the wave filter art there has developed a type of filter which uses an impedance element such as an inductance with capacitors connected at each end of the impedance. As described in copending U.S. patent application Serial No. 148,208, filed March 7, 1950, and now U.S. 2,721,311 issued October 18, 1955, such filters have generally been arranged with the capacitors spaced from each other by a distance corresponding to the length of the inductor.

Among the objects of the present invention is the provision of novel wave filters with a simpler and more effective construction.

The above, as well as additional objects of the present invention, will be more clearly understood from the following description of several of its exemplifications, reference being made to the accompanying drawings wherein.

According to the present invention a very desirable form of wave filter has a series impedance element with a shunt capacitor connected at each end of the impedance element, these capacitors being combined in a single convolute winding of electrode and dielectric strata, with one portion of the winding providing one of the capacitors and another portion providing the other. Particularly good operation is obtained when the winding portions have their respective electrode strata projecting on opposite sides and connected non-inductively. Significant advantages are obtained when the impedance element is in the form of a toroid having its axis substantially coincident to the axis of the capacitor windings, particularly volumetric efficiency and short axial length. This toroidal feature is also advantageous whether or not the capacitors are different portions of a single winding.

Further desirable features include the use of a common electrode stratum for both capacitors. An electrically conductive housing is also desirable and can be directly connected to the common electrode in a substantially closed path around the electrode axis, or to the separate electrodes if a common winding is not used. Further improvement is obtained where the winding has an axial passageway and the lead extends from a capacitor terminal on one side of the winding through the passageway to the other side.

Figure 1:
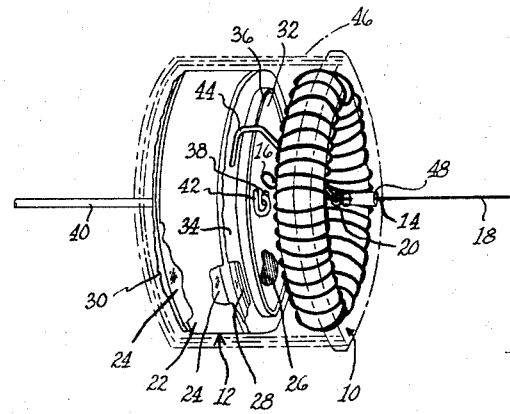
Fig. 1 is a perspective view of a preferred form of wave filter according to the present invention, the external portion being shown in a phantom manner and a portion of the interior being broken away to more clearly show its construction.

Referring now to Fig.1, there is here shown a wave filter having a toroidal inductor 10 and a pair of capacitors combined in a single convolute winding 12. The inductor is composed of a plurality of turns of a conductor, copper wire for example, appropriately sized to carry the desired currents. The turns extend completely around the toroid, one end terminating at 14 and the other end at 16. One connector 18 can merely be in the form of an extension of end 14. Another connection is conveniently made by having the end 16 directly secured to a suitable portion of one of the shunt capacitors. In the form shown, an additional connector 20 extends from end 14, where it can be secured in place, as by soldering, to another appropriate portion of the other shunt capacitor.

The winding 12 is made as a convolute assembly of dielectric and electrically conductive strata. A single set of dielectric layers can be used to make the bulk of the assembly, each of these layers extending over the entire winding. The outer layer of the dielectric is shown at 22, and the dielectric layers are provided in pairs as in the usual type of capacitor winding. However, instead of merely using two separate electrode strata, the winding 12 has three strata in the form of aluminum foils. One foil is shown at 24 and extends through the entire winding from beginning to end. Foil 24 also has one of its side margins projecting from the corresponding side of the winding, with the opposite side margin of this foil somewhat recessed into the opposite side of the winding. In capacitive relation with foil 24 there are wound two short foils 26, 28. Foil 28 extends only along the outer portion of the winding whereas foil 26 extends only along the inner portion. Each of the foils 26, 28 is arranged so that its corresponding side margins project from the winding on the side in which foil 24 is recessed. Correspondingly, the opposite side edges of foils 26, 28 are recessed where the foil 24 projects.

Each of the foils 24, 26, 28 has its projecting side edges connected together as by layers of solder 30, 32, 34, respectively. For better separation between layers 32, 34, the windings can include a few turns of additional dielectric 36, preferably located so that its margin can project out between the solder layers.

The winding is provided with a sizable axial passageway 38 through which can be led one of the terminal leads 40. The inner end 42 of this lead is arranged to project out from the passageway 38 and is bent over and secured to layer 32 as by means of additional solder. To help insulate the lead 40 from the adjacent solder layer 30, a few additional turns of dielectric can be provided around the passageway 38. These additional turns can also be arranged to project out as a sleeve from the external side of the winding where terminal lead 40 emerges.

A connection to electrode 28 is provided by lead 44 which, as shown, can have one end soldered to layer 34 and its other end connected at 20 as described above. Electrode 26 can be connected to the toroid end 16 by soldering to solder layer 32.

The filter is completed by a cylindrical metal housing 46 connected to electrode 24 as by having one end of the cylinder directly soldered to it. For optimum filtering characteristics the soldering must be done in a complete path around the axis of the unit. Both ends of the housing are insulated from the terminal leads 18, 40, and an additional sleeve 48 can be provided around terminal 18 where it penetrates the wall of the housing. The sleeve insulation of end 40 from layer 30 can also be used to insulate it from the housing at that end. To conserve bulk the housing can also be arranged to snugly fit around the toroid 10 and winding 12. The unit may also be provided with spacers of paper, or the like, lining those internal surfaces of the housing that are not needed for connection. The housing itself can also be provided with an external thread, on a projecting stud for example, for threaded engagement with equipment on which it is to be mounted.

The toroid is preferably made to have about the same external diameter as the winding 12 so that they both conveniently fit into the compact housing. At the same time the internal diameter of the toroid should provide a sufficient amount of room for the penetration of at least the centrally located leads 18 and 16. The lead 44 need not project through the center of the toroid but can be connected to the portion of the end lead that is located on the face of the toroid close to the winding 12.

Figure 2:
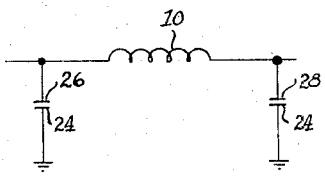
Fig. 2 is a schematic diagram illustrating the electrical equivalence of the wave filter of Fig. 1.

Fig. 2 shows the electrical operation of the wave filter illustrated in Fig. 1. It will be seen that the unit is a pi-type low-pass inductance-capacitance combination. The inductor 10 and capacitor electrodes 24, 26, 28 are identified in Fig. 2 so as to show the equivalence more clearly.

Figure 3:
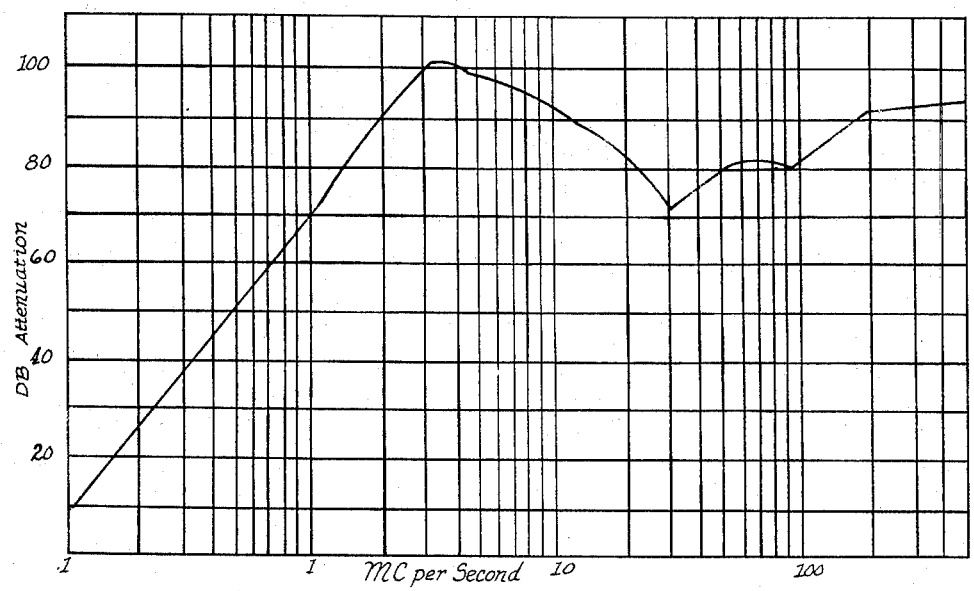
Fig. 3 is a curve showing the electrical operation of the wave filter of Fig. 1.

A construction of the type shown in Fig. 1 having a toroid consisting of 50 turns of No. 22 copper wire wound in two layers around a core having a permeability of 125 with an external winding diameter of 15/16 of an inch and an internal winding diameter of 5/16 of an inch was connected in the manner shown and combined with a capacitor winding using aluminum foils 5/16 of an inch wide and 1/4 of a mil thick. The dielectric layers were pairs of 1/4 mil thick capacitor kraft tissue 3/8 of an inch wide, each of the foils being recessed 3/32 of an inch from the edge of the dielectric. Two pairs of the kraft tissue layers were used, each pair providing one of the inter-electrode spacers. Around an axial passageway measuring 1/8 of an inch in diameter 158 turns of short foil 26 were wound following which 82 turns of short foil 28 were wound, the long foil 24 extending the entire length of the winding. The outer diameter of the capacitor winding measured 15/16 of an inch and after assembly, in the manner illustrated, was soldered into a cylindrical aluminum can having a one-inch internal diameter and an internal length of one inch. The total inductance was 153 microhenries and the total capacitance was 0.12 microfarad. When measured at 50 ohms impedance the insertion loss obtained for signals of various frequencies was found to be that shown in Fig. 3.

The features of the above invention can also be used individually to provide improved results if the maximum advantage is not desired.

Instead of using an inductor toroid, a resistor can also be used, preferably in toroidal form. More complicated filters can also be made in the above manner, as by splitting the capacitive windings into three portions each providing a separate capacitor and using two inductors or similar impedance elements connected so that each of the impedance elements is series-connected between two capacitors. These separate impedance elements can either be placed on opposite sides of the capacitance assembly, or they can be on the same side, in which case it is desirable to magnetically shield one from the other, particularly if the impedance elements are inductors. More capacitance and impedance elements can be added to further increase the number of filter sections in the unit.

The wave filter of the present invention can have its capacitance windings impregnated in the conventional manner used for capacitors, particularly where the windings operate at potentials above about 150 volts. To this end, the entire contents of the housing can be subjected to impregnation as by a polymerizable material subsequently hardened and solidified. A suitable impregnant and impregnation technique for this purpose is described in U.S. patent application Serial No. 455,116, filed September 10, 1954. Other hardenable impregnants include vinyl carbazol and mineral oil containing dissolved polyethylene. Unhardened impregnants such as the conventional mineral oil, polybutadiene, chlorinated naphthalene, chlorinated diphenyl, castor oil and the like, can also be used. If it is desired that the less viscous type of unhardened impregnants be kept from leaking out of the housing to any appreciable extent, the ends of the housing through which the terminal leads project can be sealed with a glass or resin seal. A particularly desirable form of resin is one of the epoxy type resins, as described for example in U.S. patent application Serial No. 385,317, filed October 12, 1953.

As many apparently widely different embodiments of this invention may be made without departing from the spirit and scope hereof, it is to be understood that the invention is not limited to the specific embodiments hereof except as defined in the appended claim.

What is claimed is:

A wave filter construction comprising a convolutely wound extended-foil capacitor having a common electrode extending from one end thereof and a plurality of concentrically disposed electrodes extending from the other end thereof, the extending turns of each of said electrodes soldered to one another to provide a plurality of distinct solder terminals, a toroid adjacent said other end and in axial alignment with said capacitor, a winding about said toroid with one end of said winding electrically bonded to the solder terminal of the innermost of said plurality of electrodes and the other end of said winding electrically connected to the solder terminal of another of said plurality of electrodes, and a first terminal lead electrically bonded to said solder terminal of the innermost electrodes and extending through the center of said capacitor to emerge therefrom in electrical isolation from said common electrode, said capacitor and said toroid mounted within an electrically conductive cylindrical container with the solder terminal of said common electrode electrically bonded around its entire periphery to said cylindrical container, said first terminal lead passing through one end of said container and insulated therefrom, a second terminal lead connected to said other end of said winding and extending from the other end of said container and insulated therefrom and in substantial axial alignment with said first terminal lead.

References Cited in the file of this patent

UNITED STATES PATENTS

| | | |
|---|---|---|
| 1,298,396 | Pruessman | Mar. 25, 1919 |
| 1,730,903 | Schmidt et al. | Oct. 8, 1929 |
| 1,873,298 | Davis | Aug. 23, 1932 |
| 2,644,122 | Boardman et al. | June 30, 1953 |
| 2,721,311 | Netherwood et al. | Oct. 18, 1955 |

FOREIGN PATENTS

| | | |
|---|---|---|
| 179,875 | Switzerland | Sept. 30, 1935 |
| 873,576 | Germany | Apr. 16, 1953 |
| 880,329 | Germany | June 22, 1953 |